Aug. 14, 1923.
F. T. O'GRADY
1,465,054
COLOR MOTION PICTURE PHOTOGRAPHY
Filed May 11, 1921
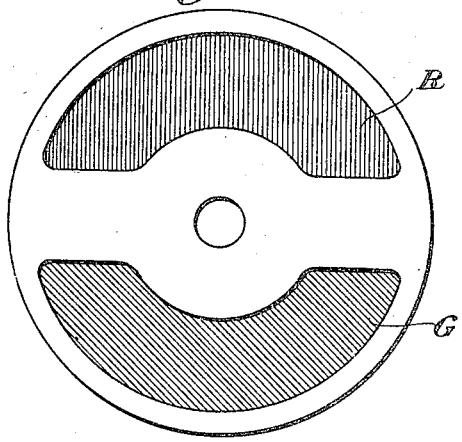
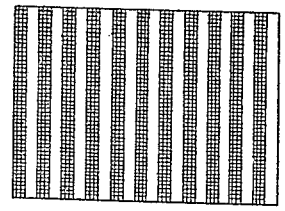
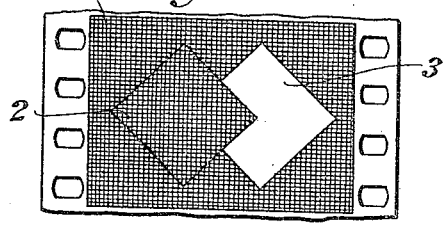
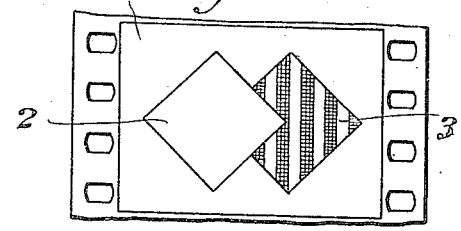
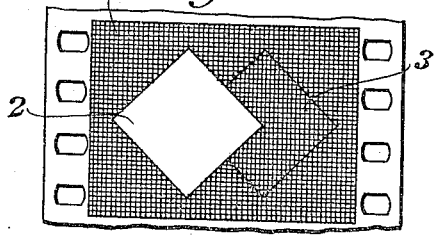
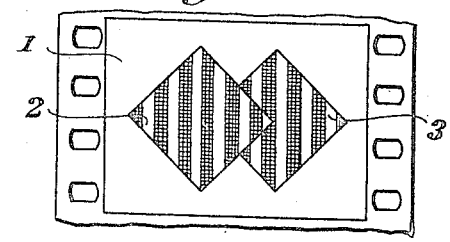
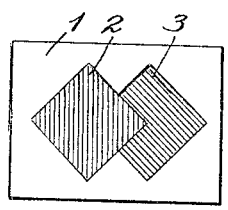
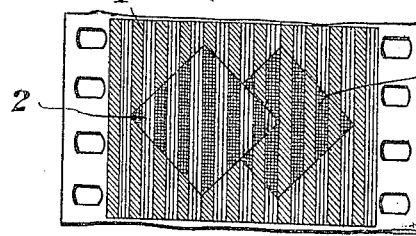
Inventor
Frederick T. O'Grady
his Attorneys Patented Aug. 14, 1923.

1,465,054

UNITED STATES PATENT OFFICE.

FREDERICK T. O'GRADY, OF FLUSHING, NEW YORK.

COLOR MOTION-PICTURE PHOTOGRAPHY.

Application filed May 11, 1921. Serial No. 468,474.

*To all whom it may concern:*

Be it known that I, FREDERICK T. O'GRADY, a citizen of the United States, and resident of Flushing, Long Island, in the borough and county of Queens, city and State of New York, have invented certain new and useful Improvements in Color Motion-Picture Photography, of which the following is a specification.

The main object of this invention is to provide a method of making positive motion picture films in natural colors, wherein a single emulsion coated positive film is used, and whereby the projection of said positive film may be done on any standard motion picture projector at the standard speed of sixteen pictures per second without the use of any additional color screens or filters.

Another object of the invention is to provide a positive film for use in motion picture projection, which will be marked longitudinally with alternate color value lines formed in the emulsion coating during the process printing, said color value line being obliterated where they cross another color value area by black lines formed in the emulsion coating during the printing of the film, color filter lines being marked on the emulsion coating of the film and superimposed upon the color value lines formed in the emulsion and corresponding in color to the color value lines covered by them, said color filter lines being obliterated by the black lines where they cross an area of another color.

The invention will be clearly understood from the following description taken in connection with the accompanying drawings, in which one method of carrying out the invention is shown diagrammatically. In order to simplify the description and drawings the process is shown and described as carried out in two colors, red and green. It will, of course, be understood, however, that the process may be equally well carried out in three or four colors if desired.

In the drawings, Fig. 1 is a diagrammatic representation of a two-color light filter disk for a motion picture camera of the known type in which a uniform intermittent movement of the film is obtained to produce alternate exposures through the color screens;

Fig. 2 a view of a lined screen plate used in printing the images on the positive film from the negative film shown in Figs. 3 and 4;

Fig. 3 a view of a portion of a negative film resulting from photographing through the red filter or screen shown in Fig. 1;

Fig. 4 a view of a portion of a negative film resulting from photographing through the green filter or screen shown in Fig. 1;

Fig. 3ª a view of a portion of a positive film printed through the red filtered image shown in Fig. 3;

Fig. 4ª a view of the same film section, as shown in Fig. 3ª, with the green filtered image printed and interspaced with the lines of the red filtered image previously printed;

Fig. 5 a view of a portion of the positive film after it is printed with the red and green images and lined with longitudinally extending red and green filter lines; and Fig. 6 a detail view of three plates to be photographed, said plates being colored, white, red and green.

In carrying out this method a suitable negative film is first produced by the use of a camera provided with a rotating color screen shown in Fig. 1, in which R designates the red screen or light-filter and G the green screen or light-filter. As is well known, the screen is rotated in synchronism with the step-by-step movement of the film so that the exposed negative film will be provided in alternate arrangement with the red and green color-value images. As is well known, when an exposure is made onto a panchromatic emulsion negative film through a red light-filter or screen only the red rays are permitted to pass through to the negative film emulsion; likewise when an exposure is made through the green light-filter or screen only the green rays pass through. In exposures so made, all those portions of the picture area are clear except where the emulsion has been acted upon by the light rays passing through the color-filter. In photographing the objects shown in Fig. 3, wherein 1 designates a white card or back ground, 2 a red square placed thereon, and 3 a green square placed thereon, the red square slightly overlapping the green square, it is manifest that when the exposure is made through the red filter or screen the result on the negative film will be as shown in Fig. 3. The green square will be clear, and the image of the red square will be photographed on the negative emulsion. Light rays from the white back ground will, of course, pass through the color screen and affect the emulsion of the negative film. The negative film will then be advanced a distance of one picture area and an exposure made through the green filter or screen. The second exposure will produce the result illustrated in Fig. 4, wherein the red square is clear and the image of the green square is photographed. The light rays from the white back ground have also affected the emulsion. This series of alternate pictures is continued throughout the length of the film.

The negative film so exposed is then developed, fixed, washed and dried in the well known manner. From this negative film the positive film is produced by a double printing operation on a single emulsion coated positive film through a lined screen, said screen having alternate clear and opaque spaces which are arranged to run longitudinally of the film and covering the picture area.

In the printing operation the images produced by exposure through one color filter or screen, for instance the red, are first printed on the positive film close together so that they are adjacent to each other, leaving out the next exposure, for instance the green. The positive film is then a second time run through the printing mechanism to print the images formed through the green color screen, these images being superposed on the picture areas which have received the previously printed images made through the red color-screen so that each pair of red and green images have been superposed on one picture area. To do this the negative film must be caused to advance the distance of two picture areas to one picture area of the positive film. Both of these printing operations are done through the line-screen plate as herein after described.

In the printing operation, light is permitted to pass through the clear spaces of the line-screen plate shown in Fig. 2, through the negative and to the positive film. In printing the images formed by exposure through the red color-filter, the light will pass directly through the clear spaces of the line-screen plate to the positive film except where there is exposure on the negative, i. e., the red square and the white back ground, therefore exposure will only be made through that portion of the negative occupied by the green square. The result being as shown in Fig. 3ª, where it will be seen that black longitudinal lines appear on the green square with corresponding clear lines or spaces between them.

After the complete printing from the red negative images, the positive film is again run through the printing apparatus and the negative images produced through the green filter or screen are printed and interspaced with the lines of previously printed red images. In the green negative images the area occupied by the red square will be clear so that the printing light will pass freely through it.

After the first printing, the line-screen plate will be moved laterally the distance of one line so that the clear spaces will occupy the spaces previously occupied by the opaque spaces. This will also insure the protection, by the opaque spaces or lines, of all the lines printed or exposed during the first printing so that when printing the negative images formed through the green filter, the previously printed images that were formed through the red filter will not be affected by the second printing. This also causes the negative images formed through the green filter to be printed on the positive film in lines alternating with the lines formed by the previous printing. The final images, therefore, will consist of photographic longitudinally extending red and green color-value lines of the object photographed.

When the line-screen is shifted laterally for the second printing the unexposed lines or spaces will be exposed to the printing light through the clear spaces of the line-screen, and the spaces or lines which were exposed in the first printing will be covered by the opaque lines or spaces on the screen. The result of this is the green images will be printed through the clear spaces of the line-screen on the unexposed spaces of the positive film. Also the unexposed area of the red image will be exposed in the second printing, therefore, the red image area will have printed on it a series of black lines. The final result of this double printing on the positive film is illustrated in Fig. 4ª.

After the second printing the positive film will be developed, washed, fixed and dried, and will then be run through a color-filter ruling machine and ruled with alternate red and green lines formed by the use of suitable dyes, the red lines being arranged to cover that portion of the picture area covered by the clear spaces of the line-screen when printing through the red image of the negative film, and the green filter lines alternate with the red lines and cover that portion of the picture area exposed through the clear spaces of the line-screen when printing the green image of the negative film. The result of this is that the red filter lines will be blotted out by the black spaces where they cross the green image area; likewise the green filter lines will be blotted out by black spaces in the positive film where they cross the red image area, as shown clearly in Fig. 5.

The positive film when ruled with the color-filter lines may be projected by means of the ordinary standard projector at the standard speed of sixteen pictures per second. In projecting such a positive film the black printed lines thereon hold back and prevent the color that is not wanted from being seen. As shown in Fig. 5, where the green filter lines cross the red square, they are blotted out by the black lines on the positive film; likewise where the red filter lines cross the green square they also are blotted out by the black lines on the positive film. In the white back ground where both the red and green filter lines are unprotected by black printed lines, the two colors blend together in such a way as to give white.

While the invention is illustrated by means of lines running continuously throughout the length of the film, it is obvious that the invention can be carried out in other ways.

What I claim is:

1. The method of making positive films for the projection of motion pictures in colors consisting in making two images on a negative film by exposures through two color filters and then developing said film, first printing from said film through a screen plate having clear and opaque spaces on a positive film the negative image made through one color filter, then moving the screen plate laterally to uncover that portion of the film covered by the opaque spaces during the first printing and then printing the image made on the negative film through the other color filter, this second image being superimposed on the same picture area occupied by the first printing, then developing, washing and drying the positive film, and finally marking on said positive film color filters corresponding to the color filters used in making the exposures on the negative film, each of the color filters being placed on the positive film to occupy the parts occupied by the clear spaces of the said screen when printing the negative image made through the corresponding color screen.

2. The method of making positive films for the projection of motion pictures in colors consisting in making two images on a negative film by exposures through two color filters and then developing said film, first printing from said film through a screen plate lined longitudinally of the film, and having alternate opaque and clear spaces which are parallel throughout the transverse film area, the negative image made through one color filter, then moving the screen plate laterally to uncover that portion of the film covered by the opaque lines during the first printing and then printing the image made on the negative film through the other color filter, this second image being superimposed on the same picture area occupied by the first printing, then developing, washing and drying the positive film, and finally marking on said positive film color filter lines corresponding to the color filters used in making the exposures on the negative film, each set of color filter lines being placed on the positive film to occupy the parts occupied by the clear spaces of the said lined screen when printing the negative image made through the corresponding color screen, the positive film when completed being covered transversely with alternate color filter lines corresponding to the color filters used in making the negative images, said color filter lines running longitudinally of the film.

3. A single emulsion coated positive film for motion picture projection having color value lines formed on one side only in the emulsion coating during the process of printing from a negative film, said lines running longitudinally of the film side by side and continuous over a picture area, the color value lines of one color being obliterated by black lines formed in the emulsion coating where said color value lines cross another color value area, and color filter lines marked directly on said emulsion coating of the positive film and superimposed upon the color value lines formed in the emulsion coating, each of said color filter lines being continuous and extending over a picture area and corresponding in color to the color value line covered by it, said color filter lines being obliterated by the black lines where they cross an area of another color.

In testimony whereof I hereunto affix my signature.

FREDERICK T. O'GRADY.